(12) United States Patent
Hirai

(10) Patent No.: US 10,097,502 B2
(45) Date of Patent: Oct. 9, 2018

(54) MANAGEMENT APPARATUS, METHOD, AND STORAGE MEDIUM FOR SPECIFYING A NETWORK INTERFACE USED FOR COMMUNICATION WITH RESPECT TO EACH OF VARIOUS NETWORK DEVICES

(71) Applicant: CANON KABUSHIKI KAISHA, Tokyo (JP)

(72) Inventor: Masahito Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/371,046

(22) Filed: Dec. 6, 2016

(65) Prior Publication Data

US 2017/0171145 A1   Jun. 15, 2017

(30) Foreign Application Priority Data

Dec. 9, 2015 (JP) ................................. 2015-240578

(51) Int. Cl.
  *H04L 12/28* (2006.01)
  *H04L 29/12* (2006.01)
  *H04L 12/721* (2013.01)
  *H04J 1/16* (2006.01)

(52) U.S. Cl.
  CPC ............ *H04L 61/103* (2013.01); *H04L 45/66* (2013.01); *H04L 61/6086* (2013.01)

(58) Field of Classification Search
  USPC .................................. 370/252, 389, 419, 466
  See application file for complete search history.

(56) References Cited

U.S. PATENT DOCUMENTS

| | | | |
|---|---|---|---|
| 2006/0159100 A1* | 7/2006 | Droms | H04L 12/2801 370/395.2 |
| 2011/0138058 A1* | 6/2011 | Ishida | H04L 12/4633 709/227 |
| 2011/0153937 A1* | 6/2011 | Annamalaisami | G06Q 10/10 711/118 |
| 2013/0339547 A1* | 12/2013 | Nath | H04L 61/103 709/245 |
| 2015/0067819 A1* | 3/2015 | Shribman | H04L 67/06 726/12 |
| 2016/0352627 A1* | 12/2016 | Narayanan | H04L 45/38 |
| 2017/0163689 A1* | 6/2017 | Ylonen | H04L 63/20 |

FOREIGN PATENT DOCUMENTS

JP        2011-081433 A        4/2011

* cited by examiner

*Primary Examiner* — John Pezzlo
(74) *Attorney, Agent, or Firm* — Canon U.S.A., Inc. IP Division

(57) ABSTRACT

A management apparatus according to embodiments of the present invention acquires, in a case where an internet protocol (IP) address of a network device having a plurality of network interfaces used for communicating with the network device is an IP address of an internet protocol version 6 (IPv6), all of values of an ipAddressIfIndex managed by the network device from the network device, and selects a value of an IfIndex corresponding to the IP address of the IPv6. In a case where the IP address of the network device is an IP address of an internet protocol version 4 (IPv4), the management apparatus acquires a value managed with an ipAdEntIfIndex from the network device.

4 Claims, 9 Drawing Sheets

MANAGEMENT APPARATUS, METHOD, AND STORAGE MEDIUM FOR SPECIFYING A NETWORK INTERFACE USED FOR COMMUNICATION WITH RESPECT TO EACH OF VARIOUS NETWORK DEVICES

BACKGROUND OF THE INVENTION

Field of the Invention

The present invention relates to a technique for managing an apparatus connected to a network.

Description of the Related Art

There are typical management apparatuses that manage image processing apparatuses and various terminals connectable to a network as management-target apparatuses via the network. The management apparatus may manage the image processing apparatuses and various terminals based on physical addresses (media access control (MAC) addresses) of these management-target apparatuses as identifiers. The management apparatus that manages a MAC address can acquire the MAC address based on a logical address (internet protocol (IP) address) used for communicating with a management-target apparatus.

The management apparatus acquires the MAC address by using an element (i.e., ipAdEntIfIndex) of an ipAddrTable defined by the management information called a management information base (MIB) of a simple network management protocol (SNMP). In this manner, the management apparatus can specify an index value of a network interface corresponding to a communicating IP address for an internet protocol version 4 (IPv4) and acquire the MAC address.

Some management-target apparatuses have a plurality of network interfaces. Japanese Patent Application Laid-Open No. 2011-81433 discusses a technique for enabling a multifunction peripheral (MFP) having a plurality of network interfaces to respond to a request, in which an ifType and an index value are specified, from an external apparatus with the MIB information corresponding to any of the network interfaces. In particular, according to the technique described in Japanese Patent Application Laid-Open No. 2011-81433, in a case where the MFP receives a request in which a specific value (i.e., "1") is specified as an index value, the MFP responds to the request with the MIB information about the network interface used for the request as the information corresponding to the specific value.

In addition, with respect to each of the IP addresses of the IPv4 and an internet protocol version 6 (IPv6), one element (i.e., ipAddressIfIndex) of the ipAddressTable for managing the index values of the network interfaces is defined by the Request for Comments (RFC) 4293.

Some existing management-target apparatuses in the network may each include a plurality of network interfaces in order to support wired and wireless communications. In a case where the management apparatus uses the MAC address as the information for specifying the management-target apparatus, the management apparatus has to acquire the MAC address by specifying the network interface which the management-target apparatus uses for the communication.

Here, the MFP serving as the management-target apparatus discussed in Japanese Patent Application Laid-Open No. 2011-81433 responds to the request in which the specific value (i.e., "1") is specified from the management apparatus with the MIB information about the network interface used for the request regardless of the specific value. However, a typical management-target apparatus simply responds thereto with the MIB information corresponding to the index value specified by the management apparatus. Therefore, the management apparatus needs to previously specify network interfaces used by the respective management-target apparatuses for performing communication to acquire the MAC addresses of the network interfaces for management of various types of general-purpose management-target apparatuses.

The management-target apparatus executes communication through an optional address type of any of the IPv4 and the IPv6. In addition, there are the management-target apparatuses that support and do not support the above-described MIB including the ipAddressIfIndex in an existing network.

SUMMARY OF THE INVENTION

Embodiments of the present invention are directed to a method for enabling a management apparatus to appropriately specify a network interface used for communication with respect to each of various management-target apparatuses.

Embodiments of the present invention include a management apparatus capable of communicating with a network device including a plurality of network interfaces. The management apparatus includes a determination unit configured to determine whether an internet protocol (IP) address of the network device used for communicating with the network device is an IP address of an internet protocol version 4 (IPv4) or an IP address of an internet protocol version 6 (IPv6), a first request unit configured to issue, in a case where the determination unit determines that the IP address is the IP address of the IPv4, to the network device, an acquisition request for a value used to identify a network interface managed, in correspondence with the IP address of the IPv4, by the network device with the IP address of the network device being specified, a second request unit configured to issue, in a case where the determination unit determines that the IP address is the IP address of the IPv6, to the network device, one or more acquisition requests for a plurality of values each of which is used to identify a corresponding one of a plurality of network interfaces, each of the plurality of network interfaces corresponding to a different one of a plurality of addresses of the IPv4 and the IPv6 managed by the network device in a table, a specification unit configured to specify a value for identifying a network interface corresponding to the IP address of the IPv6 included in a response from the network device to the acquisition request issued by the second request unit, and a third request unit configured to issue an acquisition request for a media access control (MAC) address to the network device with a value included in a response from the network device to the acquisition request issued by the first request unit being specified or with the value specified by the specification unit being specified.

Further features of the present invention will become apparent from the following description of exemplary embodiments with reference to the attached drawings.

DESCRIPTION OF THE EMBODIMENTS

Hereinafter, an exemplary embodiment of the present invention will be described with reference to the appending drawings.

Figure 1:
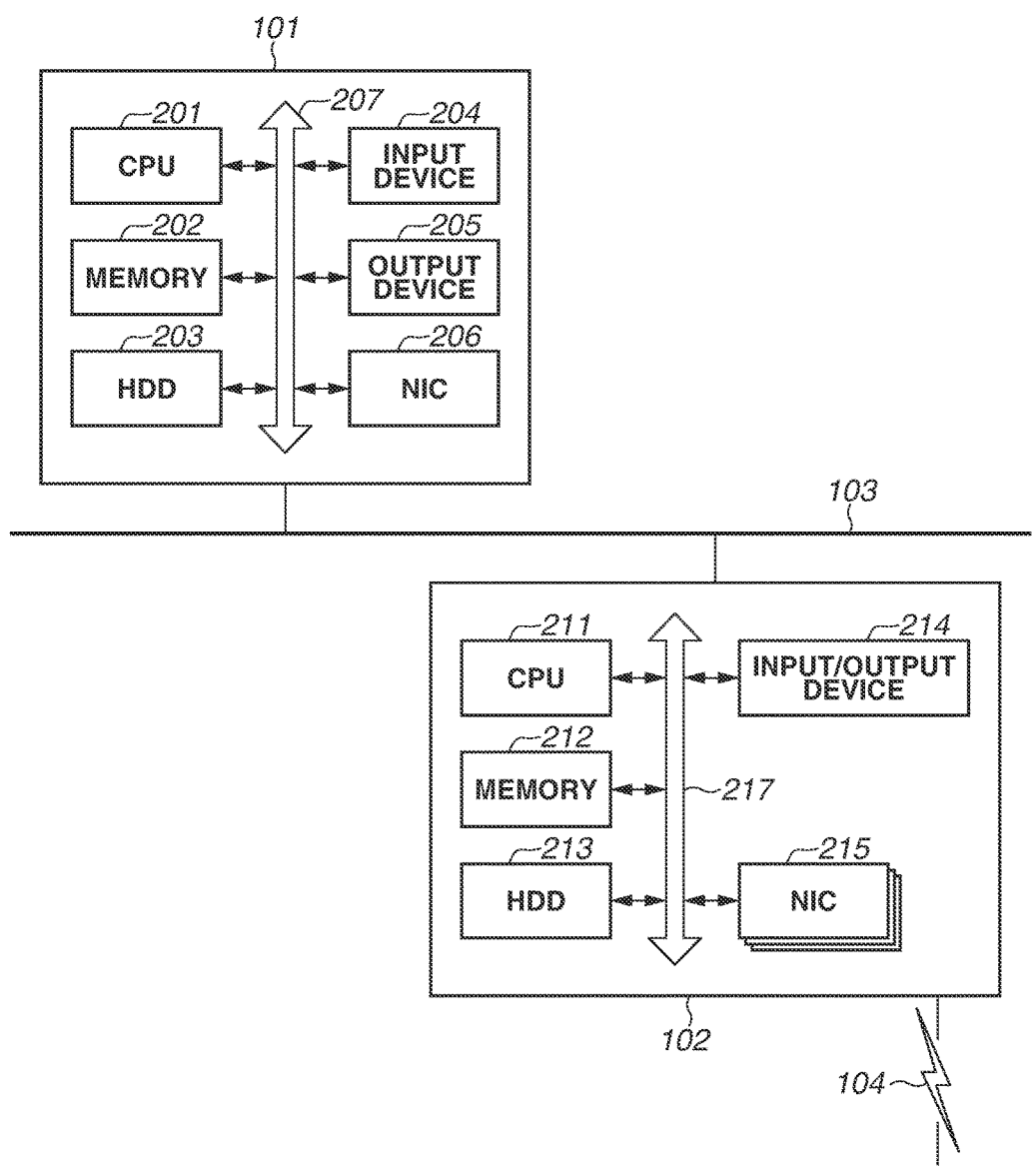
FIG. 1 is a block diagram illustrating a network configuration and a hardware configuration of each apparatus according to an exemplary embodiment of the present invention.

First, a configuration of an entire system for embodying embodiments of the present invention and a hardware configuration of each apparatus will be described with reference to FIG. 1. A system illustrated in FIG. 1 includes a management apparatus 101, a management-target apparatus 102, and a network 103. The management apparatus 101 can communicate with various network devices including the management-target apparatus 102 via the network 103. The management-target apparatus 102 may be an image processing apparatus such as a printing apparatus or a network camera, or various network terminals. Further, the management apparatus 101 can communicate with and manage a plurality of management-target apparatuses 102 (not illustrated) via the network 103.

The management apparatus 101 includes a central processing unit (CPU) 201, a memory 202, a hard disk drive (HDD) 203, an input device 204, an output device 205, and a network interface card (NIC) 206, which are connected to each other via a bus 207.

The CPU 201 loads a program and data according to the exemplary embodiment stored in the HDD 203 onto the memory 202, and executes the program loaded thereon. The input device 204 acquires information input by a user. The output device 205 displays information necessary for operating the program. The network interface 206 controls the communication performed via the network 103, and transmits a signal for acquiring the information from, for example, the management-target apparatus 102.

The management-target apparatus 102 includes therein a CPU 211, a memory 212, an HDD 213, an input/output device 214, and an NIC 215, which are connected to each other via a bus 217.

The CPU 211 loads a program for responding to an information acquisition request from the management apparatus 101 stored in the HDD 213 onto the memory 212, and executes the program loaded thereon. In a case where the HDD 213 is not included in the management-target apparatus 102, the memory 212 serves as the HDD 213. The NIC 215 controls the communication performed via the network 103, and receives a request signal, for example, from the management apparatus 101 and transmits a response signal. The input/output device 214 receives a user input. Further, the input/output device 214 displays information for the user. Further, the management-target device 102 includes various sensors (not illustrated) for monitoring a status such as a failure. Further, in a case where the management-target apparatus 102 is an image processing apparatus, the management-target apparatus 102 includes an image processing engine (e.g., a printing unit or an imaging unit) and an engine controller as hardware.

In addition, the management-target apparatus 102 may include a plurality of NICs 215 (hereinafter, also referred to as "network interface(s) 215") to connect the management-target apparatus 102 to a wired local area network (LAN) or a wireless LAN. Furthermore, even if the management-target apparatus 102 physically includes just one network interface 215, a virtual network interface for communicating with its own apparatus may also exist. In a case where the management-target apparatus 102 includes the plurality of network interfaces 215, the management-target apparatus 102 may connect to a network 104 other than the network 103.

Figure 2:
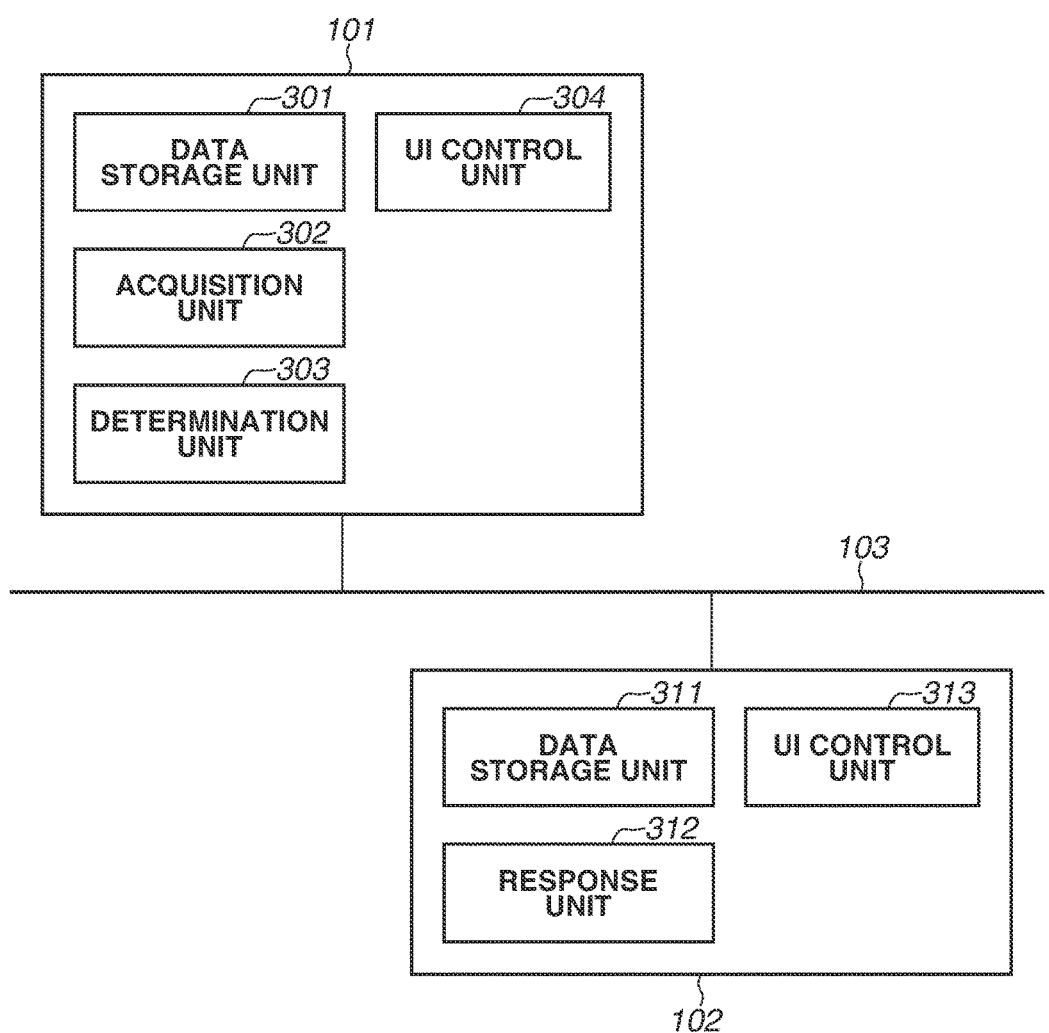
FIG. 2 is a block diagram conceptually illustrating a software module according to the exemplary embodiment.

FIG. 2 is a conceptual block diagram of software modules embodying the present exemplary embodiment. Each of the modules illustrated in FIG. 2 is a conceptual processing module, and is an entity in a case where the program according to embodiments of the present invention is executed by the management apparatus 101 or the management-target apparatus 102.

The management apparatus 101 includes a data storage unit 301, an acquisition unit 302, a determination unit 303, and a user interface (UI) control unit 304.

The data storage unit 301 stores data acquired from the management-target apparatus 102 in a storage region such as the memory 202 or the HDD 203. For example, the data storage unit 301 stores data about one or more management-target apparatuses 102 in a form of a device list as illustrated in Table 1. As illustrated in Table 1, a device a MAC address of which has not yet acquired can be also managed.

TABLE 1

Device List

| IP Address | MAC Address | Device Type |
|---|---|---|
| 192.168.1.3 | aa:bb:cc:dd:ee:ef | 0 |
| 192.168.1.5 | aa:bb:cc:ed:ed:ed | 1 |
| 192.168.1.10 | | |

The acquisition unit 302 is a module for acquiring the information from the management-target apparatus 102 through various protocols. For example, in obtaining the information by using a simple network management protocol (SNMP), the acquisition unit 302 generates an acquisition request packet compliant with the SNMP and transmits the packet via the network interface 206. Further, the acquisition unit 302 receives a response packet from the management-target apparatus 102 via the network interface 206 and acquires data from the packet.

The determination unit 303 executes determination processing based on the data acquired by the acquisition unit 302. For example, the determination unit 303 executes determination processing for specifying the MAC address corresponding to the IP address. This determination result is stored in a storage region such as the memory 202 or the HDD 203 by the data storage unit 301. The UI control unit 304 generates information to be displayed on the output device 205. Further, the UI control unit 304 acquires information input to the input device 204.

The management-target apparatus 102 includes a data storage unit 311, a response unit 312, and a UI control unit 313.

The data storage unit 311 executes storage control of data unique to the management-target apparatus 102. The management-target apparatus 102 manages data by using a management information base (MIB). The response unit 312 generates a response packet in response to the acquisition request from the management apparatus 101 based on the stored data, and transmits the response packet by using any of the plurality of network interfaces 215. The UI control unit 313 generates a screen to be displayed on the input/output device 214 and acquires information input by a user.

The SNMP is a protocol for performing management and acquisition of the information about network devices. More specifically, the SNMP allows the management apparatus 101 to access a group of management information called the MIB within the network devices such as the management-target apparatus 102 by specifying an identifier of a tree structure called an object identifier (OID).

Figure 3:
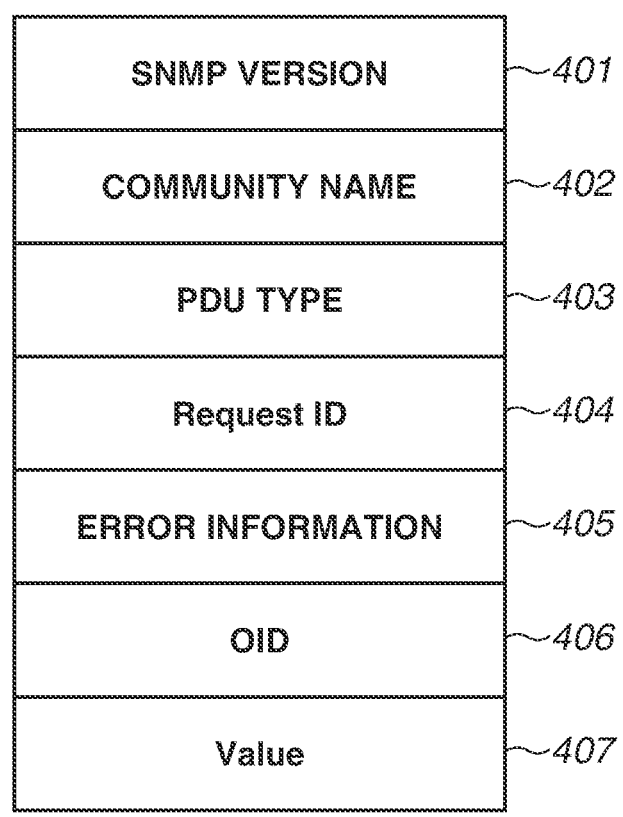
FIG. 3 is a diagram illustrating a structure of a simple network management protocol (SNMP) packet.

FIG. 3 is a diagram illustrating an example of a structure of the packet to be transmitted and received by the acquisition unit 302.

An SNMP version 401 represents a version of the SNMP, and a value "0" represents the version 1. The management-target apparatus 102 returns a response to the management apparatus 101 only when a community name 402 included in the packet transmitted from the management apparatus 101 is identical to the community name of the management-target apparatus 102.

A protocol data unit (PDU) type 403 is a PDU type value which varies between an acquisition request packet and a response packet. Further, in the case of the acquisition packet, either "0×A0" (GetRequest) or "0×A1" (GetNextRequest) is set to the PDU type 403. In a case where a value corresponding to the OID specified in the packet is to be acquired, "0×A0" is set to the PDU type 403, whereas "0×A1" is set thereto when a value corresponding to the OID subsequent to the specified OID is to be acquired. In the case of the response packet, "0×A2" is set to the PDU type 403.

A request identifier (ID) 404 is generated by the acquisition unit 302 at each request, and a same value is set thereto for both the acquisition request packet and its response packet. Error information 405 is empty in the acquisition request packet, and has a value for error information in the response packet indicating an error. A value 407 is a value with respect to an OID 406. The value 407 with respect to the OID 406 is empty in the acquisition request packet. In the response packet, the response unit 312 of the management-target apparatus 102 sets data corresponding to the management-target apparatus 102 to the value 407. In the acquisition request packet, a plurality of OIDs 406 can be specified.

For example, in a case where "0×A1" (GetNextRequest) is specified as the PDU type 403, and "1.3.6.1.2.1.2.2.1.3" corresponding to the ifType is specified as the OID 406 in the acquisition request, the value 407 corresponding to the OID 406 of "1.3.6.1.2.1.2.2.1.3.1" can be acquired from the network device as a response thereto. Further, when "0×A1" (GetNextRequest) is specified as the PDU type 403 and "1.3.6.1.2.1.2.2.1.3.1" is specified as the OID 406, the value 407 corresponding to the OID 406 of "1.3.6.1.2.1.2.2.1.3.2" can be acquired from the network device as a response thereto.

Figure 4:
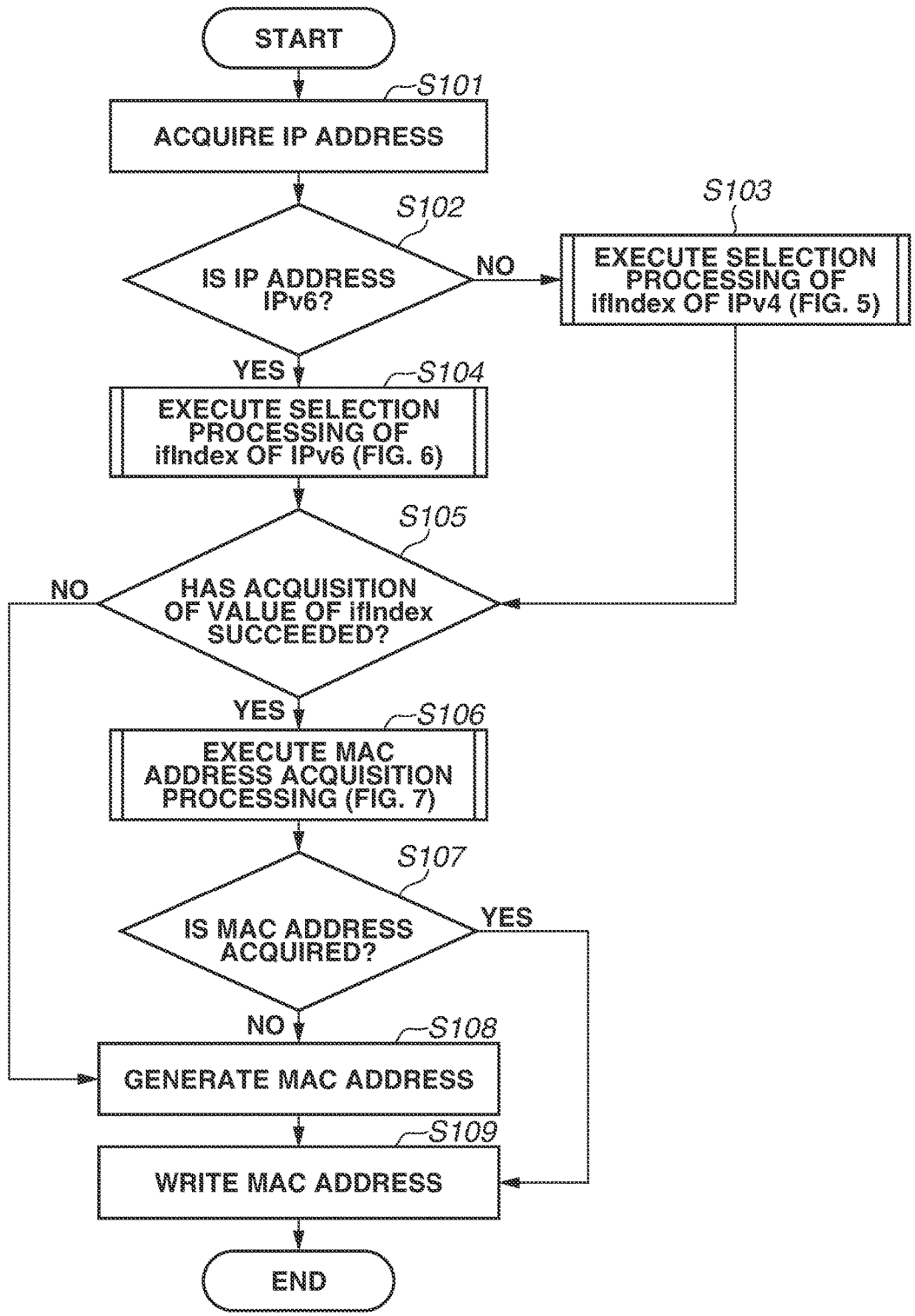
FIG. 4 is a flowchart illustrating an entirety of processing executed by a management apparatus.

FIG. 4 is a flowchart illustrating the processing executed by the management apparatus 101. The CPU 201 of the management apparatus 101 realizes the processing illustrated in FIG. 4 by executing the program according to embodiments of the present invention.

The management-target apparatus 102 includes the one or more network interfaces 215, and a MAC address is allocated to each of the network interfaces 215. The management apparatus 101 specifies a MAC address of any of the network interfaces 215 corresponding to the IP address allocated to the management-target apparatus 102 in communication through the processing illustrated in FIG. 4.

The management apparatus 101 stores and manages the IP address of the management-target apparatus 102 as a device list. The information about the management-target 102 a MAC address of which is unknown is also managed in the device list. In addition, the IP address input by a user through a screen provided by the UI control unit 304 may be acquired and stored in the device list.

First, in step S101, the acquisition unit 302 acquires an IP address from the device list. The IP address that is used in communicating with the management-target apparatus 102 is acquired from data such as a communication packet used in that communication.

In step S102, the acquisition unit 302 determines whether the IP address acquired in step S101 is an internet protocol version 6 (IPv6) address. As to whether the IP address is an internet protocol version 4 (IPv4) address or the IPv6 address is determined by a difference in a data length and a data format. The IPv4 address is 32 bits in length, separated into sections of 8 bits by periods, and expressed in decimal. The IPv6 address is 128 bits in length, and there is a rule that the IPv6 address is separated into sections of 16 bits by colons and expressed in hexadecimal. In addition, in a case where the IPv6 address satisfies such a condition that two or more consecutive sections thereof separated by colons each only include zero, the IPv6 address can be expressed in a simplified manner by replacing such consecutive sections with two consecutive colons. However, in a case where the address type is determined by the data length, the determination is made with the IPv6 address expressed in a non-simplified display format.

In step S102, if the IP address is determined as the IPv6 address (YES in step S102), the processing proceeds to step S104. In step S102, if the IP address is not determined as the IPv6 address but the IPv4 address (NO in step S102), the processing proceeds to step S103. The processing in step S103 will be described below in detail with reference to FIG. 5. Further, the processing in step S104 will be described below in detail with reference to FIG. 6.

Figure 5:
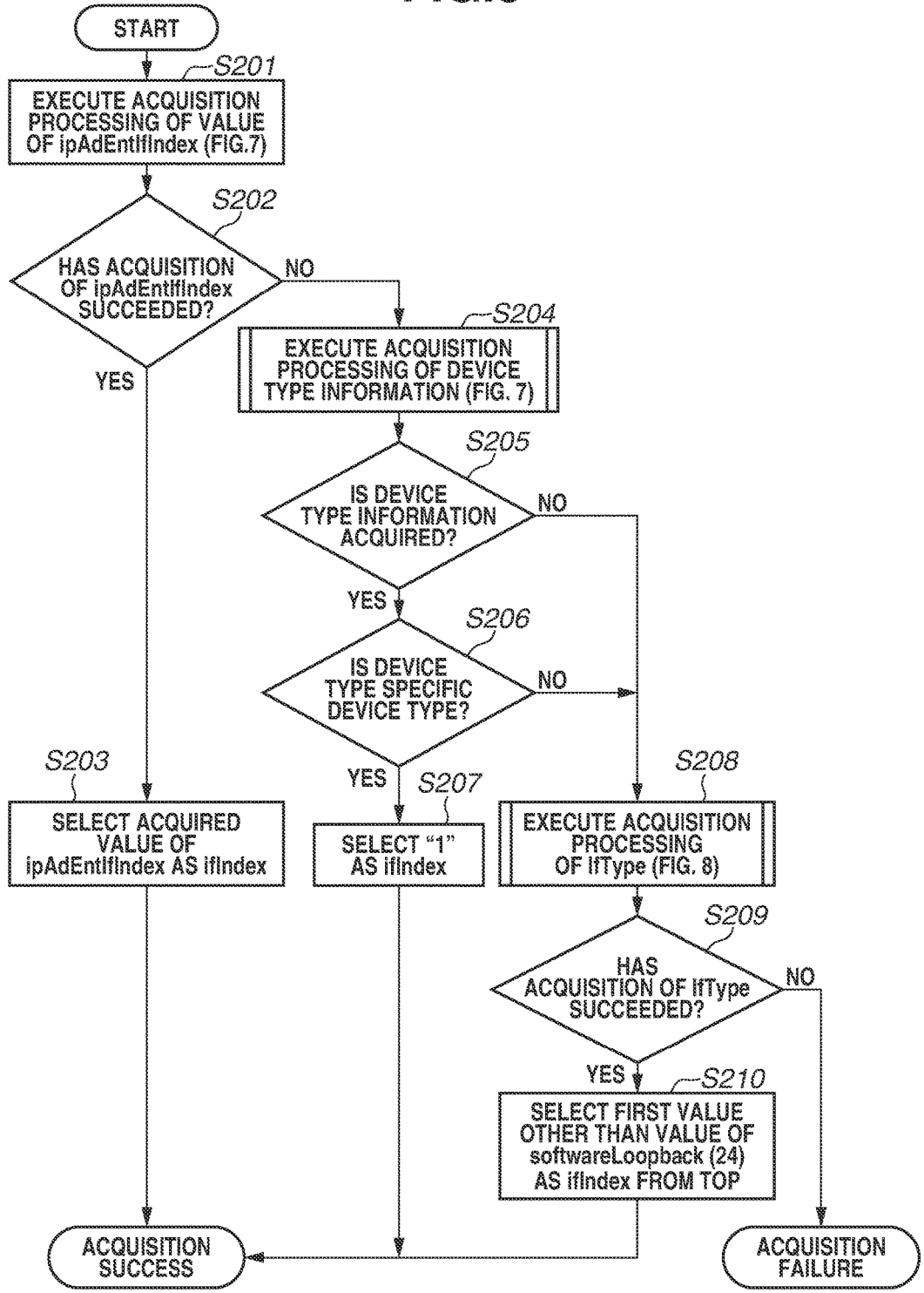
FIG. 5 is a flowchart illustrating selection processing of a value of an ifIndex in an internet protocol version 4 (IPv4).
Figure 6:
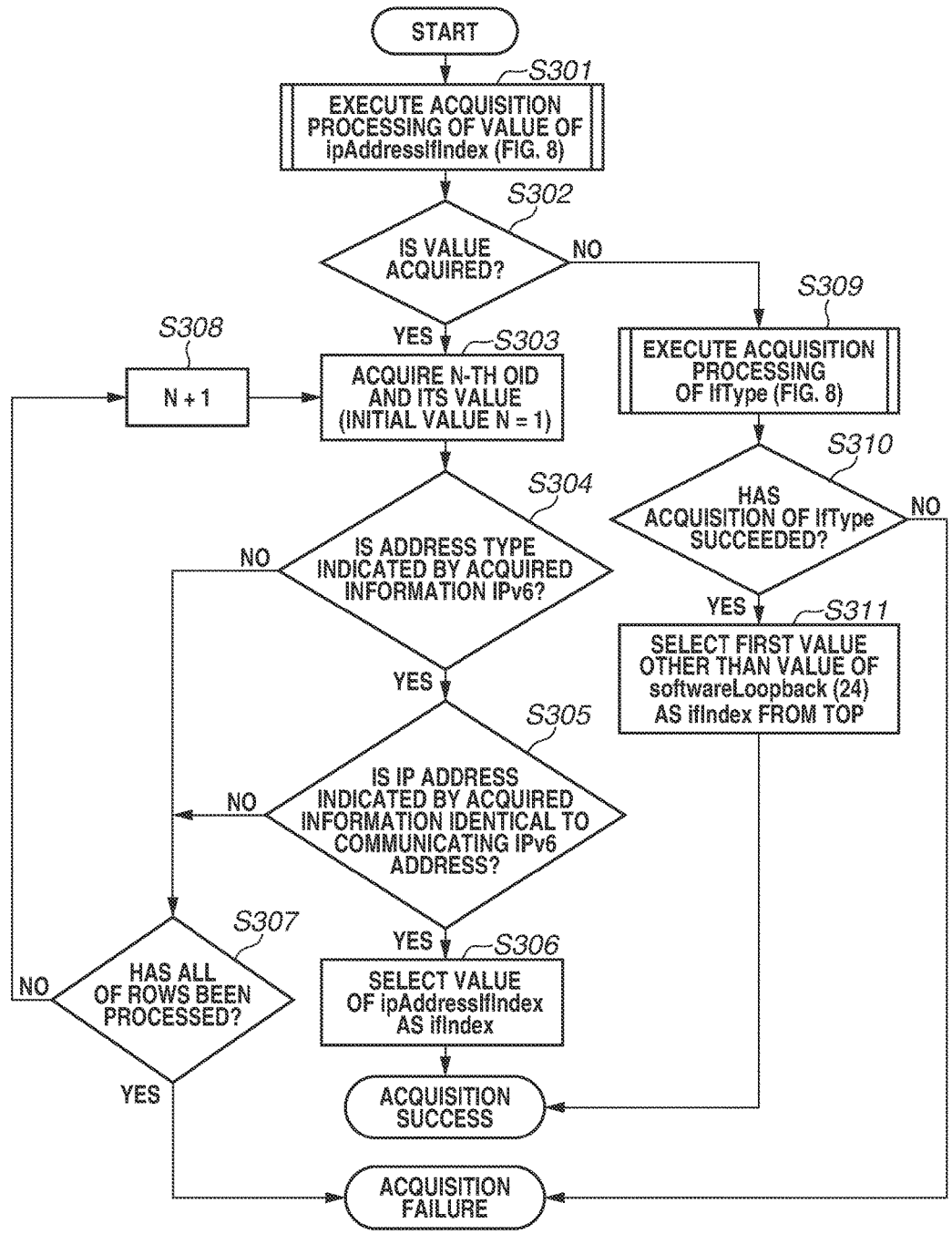
FIG. 6 is a flowchart illustrating selection processing of a value of an ifIndex in an internet protocol version 6 (IPv6).

In FIG. 6, one element of the ipAddressTable, "ipAddressIfIndex", is used for the determination processing. In the ipAddressIfIndex, an index value of the network interface 215 is defined for each of the IPv4 and the IPv6 addresses. However, some management-target apparatuses as monitoring targets may not support the ipAddressIfIndex, which is comparatively new definition of the MIB. To that end, in the present exemplary embodiment, in a case where the IP address is determined as the IPv4 address in step S102, determination processing will be executed by using one element of the ipAddrTable, "ipAdEntIfIndex", as illustrated in FIG. 5 described below. Accordingly, under a specific condition such that the management apparatus 101 previously knows that all of the devices existing as the monitoring-targets support the new MIB, the determination processing using the ipAddressIfIndex illustrated in FIG. 6 may be executed regardless of whether the IP address acquired in step S101 is the IPv4 address or the IPv6 address.

In step S103 and S104, a value related to the network interface 215 corresponding to the IP address acquired in step S101, i.e., a value of the ifIndex in the MIB is selected.

Here, a value of "ifIndex" is a unique value allocated to each of the one or more network interfaces 215 of the management-target apparatus 102. The ifIndex is also an index value of an ifTable as a part of the MIB illustrated in Table 2. The ifTable includes elements such as "ifType", "ifDescr", and "ifPhysAddress". The ifTable is stored in and managed by each management-target apparatus 102.

TABLE 2 ifTable

| ifIndex | ifDescr | ifType | ifPhysAddress |
|---|---|---|---|
| 1 | lanc0 | ethernet-csmacd(6) | 00:00:85:67:2C:79 |
| 2 | lanc1 | ieee80211(71) | 00:00:85:AD:BD:ED |
| 3 | 0 | softwareLoopback(24) | 00:00:00:00:00:00 |

In step S105, the determination unit 303 determines whether acquisition of the value of the ifIndex has succeeded in step S103 or S104. If the acquisition thereof has succeeded (YES in step S105), the processing proceeds to step S106. If the acquisition thereof has failed (NO in step S105), the processing proceeds to step S108. In step S106, processing for acquiring the MAC address using the value of the ifIndex is executed. The processing for acquiring the MAC address will be described in detail below with reference to FIG. 7.

In step S107, the determination unit 303 determines whether the MAC address is acquired in step S106. If the determination unit 303 determines that the MAC address is acquired (YES in step S107), the processing proceeds to step S109, and if the determination unit 303 determines that the MAC address is not acquired (NO in step S107), the processing proceeds to step S108. In step S108, the data storage unit 301 generates a MAC address as a value that is either random or sequential within a range of a free-space of the MAC address corresponding to the IP address in the device list acquired in step S101. In step S109, the data storage unit 301 writes the MAC address in the device list.

The above-described processing in step S103 will be described in detail below with reference to FIG. 5. In FIG. 5, the processing for selecting a value of the ifIndex in the IPv4 is described.

In step S201, the acquisition unit 302 generates a packet for acquiring the value of the ifIndex from the ipAddrTable by specifying the IP address acquired in step S101. The ipAddrTable (Table 3) is a data table including a part of the information in the MIB managed by the management-target apparatus 102. By specifying the IP address in the "ipAdEntAddr" in the packet to be generated here, a value of the corresponding ipAdEntIfIndex can be acquired. Herein, the ipAdEntIfIndex has the same value as that of the ifIndex. A flow of the processing for acquiring the value in step S201 will be described below with reference to the flowchart in FIG. 7.

TABLE 3 ipAddrTable

| ipAdEntAddr | ipAdEntIfIndex |
|---|---|
| 192.168.200.1 | 1 |
| 192.168.100.2 | 2 |
| 172.0.0.1 | 0 |

In step S202, the determination unit 303 determines whether the value of the ipAdEntIfIndex has been acquired in step S201. If the acquisition of the value of the ipAdEntIfIndex has succeeded (YES in step S202), the processing proceeds to step S203. If the acquisition of the value thereof has failed (NO in step S202), the processing proceeds to step S204.

In step S203, the determination unit 303 selects the value of the ipAdEntIfIndex as a value of the ifIndex. Then, the acquisition of the value of the ifIndex is regarded as a success, and the processing proceeds to step S105 illustrated in FIG. 4.

In step S204, the acquisition unit 302 executes processing for acquiring device type information about the management-target apparatus 102 by specifying the OID 406 such as "hrDeviceID". The processing for acquiring the value in step S204 will be described below with reference to the flowchart in FIG. 7.

In step S205, the determination unit 303 determines whether the device type information is acquired as a result of the processing in step S204. If the device type information is acquired (YES in step S205), the processing proceeds to step S206, and if the device type information is not acquired (NO in step S205), the processing proceeds to step S208. In step S206, the determination unit 303 determines whether the device type information acquired in step S204 indicates a specific device type the information of which is previously stored and managed by the management apparatus 101. If the device type is determined as the specific device type (YES in step S206), the processing proceeds to step S207, and if the device type is determined as a non-specific device type (NO in step S206), the processing proceeds to step S208. In step S207, the determination unit 303 selects "1" as the ifIndex. Then, the acquisition of the value of the ifIndex is regarded as a success, and the processing proceeds to step S105 illustrated in FIG. 4.

In addition, the specific device type is registration information used exceptionally, which indicates a type of the management-target apparatus 102 whose index value corresponding to the interface for communicating with the management apparatus 101 is previously set to "1" as a default. However, the management-target apparatus 102 of this type may be changed due to various factors such as changes in the platform or the management settings, so that information about the specific device type is used exceptionally in the present exemplary embodiment.

In step S208, the acquisition unit 302 executes processing for acquiring the value of the ifType. The acquisition processing in step S208 will be described below with reference to the flowchart in FIG. 8. In step S209, the determination unit 303 determines whether acquisition of the ifType has succeeded. If the acquisition is determined as a success (YES in step S209), the processing proceeds to step S210. If the acquisition is determined as a failure (NO in step S209), the acquisition of the value of the ifIndex is regarded as a failure, and the processing proceeds to the processing in step S105 illustrated in FIG. 4.

In step S210, the acquisition unit 302 selects a top value other than a value of "softwareLoopback (24)" (i.e., a value corresponding to a loopback address) as a value of the ifIndex from the plurality of acquired values of the ifType. Then, the acquisition of the value of the ifIndex is regarded as a success, and the processing proceeds to step S105 illustrated in FIG. 4. In addition, in step S210, a value of the ifType corresponding to "ethernetCsmacd (6)" may be selected as a value of the ifIndex. This value is a value for identifying the network interface 215 connected to the Ethernet (registered trademark).

The above-described processing in step S104 will be described in detail with reference to FIG. 6. The processing for selecting a value of the ifIndex in the IPv6 will be described.

The management-target apparatus 102 stores and manages a part of the MIB called "ipAddressTable" illustrated in Table 4. By specifying "ipAddressAddrType" and "ipAddressAddr" in the table, the acquisition unit 302 can acquire a value of the ipAddressIfIndex. Further, a value of the ipAddressIfIndex is the same value as that of the ifIndex, so that the MAC address can be acquired by using the ifIndex. This table supports addresses of both of the IPv4 and the IPv6. An OID of the ipAddressIfIndex is expressed in a form of "ipAddressIfIndex.ipAddressAddrType.ipAddressPrefix. (IP address)". Further, "ipAddressPrefix." can be omitted.

TABLE 4 ipAddressTable

| ipAddressAddrType | ipAddressAddr | ipAddressIfIndex |
|---|---|---|
| IPv4(1) | 192.168.100.10 | 3 |
| IPv4(1) | 192.168.10.10 | 2 |
| IPv4(1) | 172.0.0.1 | 1 |
| IPv6(2) | fd00:0:ac18:400:81de:80ff:9b39:c6a9 | 2 |
| IPv6(2) | fd00:0:ac18:400:81de:80ff:9b39:77b1 | 3 |
| IPv6(2) | 0:0:0:0:0:0:0:1 | 1 |

In step S301, the acquisition unit 302 generates a packet for acquiring a value of each element (i.e., ipAddressIfIndex) in the ipAddressTable, and transmits the packet as an acquisition request. The processing for acquiring the value in step S301 will be described below with reference to the flowchart in FIG. 8.

In step S302, the acquisition unit 302 determines whether one or more values are acquired with respect to the ipAddressIfIndex. If the acquisition unit 302 determines that the values of the ipAddressIfIndex are acquired (YES in step S302), the processing proceeds to step S303. If the acquisition unit 302 determines that the values thereof are not acquired (NO in step S302), the processing proceeds to step S309. The processing in steps S309, S310, and S311 is similar to the processing in steps S208 to S210 described above, and the description thereof is omitted.

In step S303, the determination unit 303 acquires the N-th OID and a value thereof from the information acquired in step S301. At this time, an initial value of "N" is "1". The one or more OIDs and the values thereof described in each row of Table 4 are included in the information acquired in step S301.

In step S304, the determination unit 303 determines whether the address type indicated by the information acquired in step S303 is the IPv6 address. More specifically, the address type is the IPv6 address in a case where a value of the ipAddressAddrType included in the OID is "2". As a result of the determination in step S304, if the value thereof is determined as "2", the processing proceeds to step S305. If the address type is the IPv6 address (YES in step S304), the processing proceeds to step S305, and if the address type is not the IPv6 address (NO in step S304), the processing proceeds to step S307.

In step S305, the determination unit 303 determines whether the IP address indicated by the information acquired in step S303 is identical to the IP address, allocated to the management-target apparatus 102 in communication, acquired in step S101 described above. Here, a portion (IP address) of the OID ("ipAddressIfIndex.ipAddressAddrType.ipAddressPrefix.(IP address)") of the above-described ipAddressIfIndex is compared to the communicating IP address acquired in step S101 described above. In addition, since a portion "ipAddressPrefix." can be omitted, the IP address portion may be specified by checking whether a size of data subsequent to a portion "ipAddressAddrType." is greater than 16-byte. As a result of the determination in step S305, if the determination unit 303 determines that the IP address is identical to the communicating IP address (YES in step S305), the processing proceeds to step S306. If the determination unit 303 determines that the IP address is not identical to the communicating IP address (NO in step S305), the processing proceeds to step S307.

In step S306, the determination unit 303 selects the value of the ipAddressIfIndex indicated by the information acquired in step S303 as a value of the ifIndex. Through the processing, a value of the ifIndex corresponding to the communicating address is specified. Then, the acquisition of the value of the ifIndex is regarded as a success, and the processing proceeds to step S105 illustrated in FIG. 4.

In step S307, the determination unit 303 determines whether all of the rows included in the information acquired in step S301 have been processed. If the determination unit 303 determines that all of the rows have been processed in step S307 (YES in step S307), the acquisition thereof is regarded as a failure, and the processing proceeds to step S105 illustrated in FIG. 4. If the determination unit 303 determines that not all of the rows have been processed (NO in step S307), the processing proceeds to step S308. In step S308, the determination unit 303 counts up the value N by 1, and the processing returns to step S303.

Figure 7:
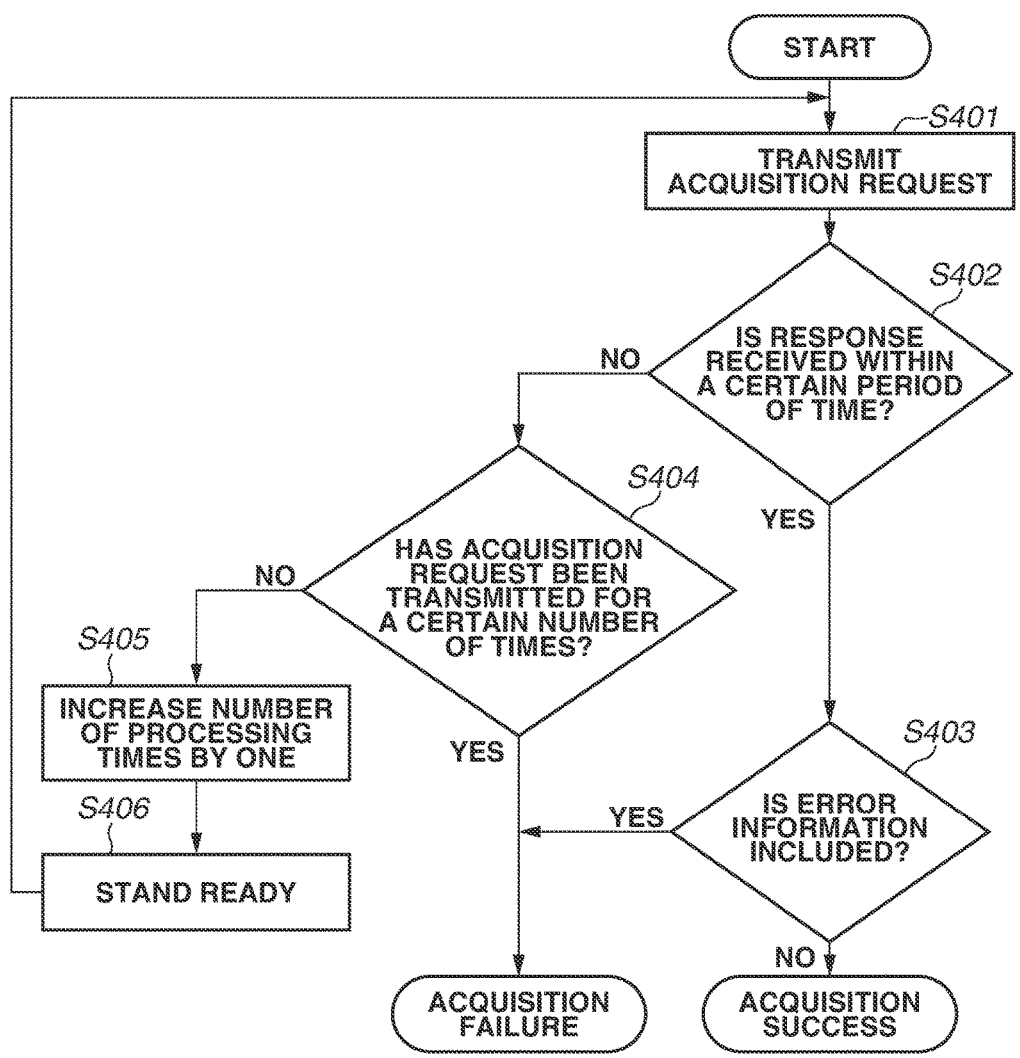
FIG. 7 is a flowchart illustrating processing for acquiring a value with respect to one object identifier (OID).

FIG. 7 is a flowchart illustrating processing for acquiring the value 407 with respect the specification of one OID 406. This processing corresponds to the processing for acquiring a MAC address described in step S106, the processing for acquiring a value of the ipAdEntIfIndex described in step S201, or the processing for acquiring device type information described in step S204.

In step S401, the acquisition unit 302 specifies one OID, generates a transmission packet for acquiring a desired value, and transmits the packet to the management-target apparatus 102 as an acquisition request. In the processing for acquiring the MAC address in step S106, the value of the ifIndex successfully acquired in step S103 or S104 is specified as the OID 406. More specifically, in order to acquire a value of the ifPhysAddress of the ifTable, "1.3.6.1.2.1.2.2.1.6.(a value of the ifIndex)" is specified as the OID 406. Further, in the processing for acquiring the value of the ipAdEntIfIndex in step S201, the communicating IP address is specified as the OID 406. Specifically, "1.3.6.1.2.1.4.20.2.(IP address)" is specified as the OID 406.

In step S402, the acquisition unit 302 determines whether a response is received from the management-target apparatus 102. A predetermined time is set as a latency time for the response from the management-target apparatus 102. In step S402, if the acquisition unit 302 determines that the response is received (YES in step S402), the processing proceeds to step S403. If the acquisition unit 302 determines that the response is not received (NO in step S402), the processing proceeds to step S404.

In step S403, the acquisition unit 302 determines whether error information is included in the response packet received from the management-target apparatus 102, and if the acquisition unit 302 determines that the error information is included (YES in step S403), the processing is ended as a failure in the acquisition. In step S403, if the acquisition unit 302 determines that the error information is not included (NO in step S403), the processing is ended as a success in the acquisition. Herein, the MAC address is acquired if the processing is executed from step S106 described above, whereas a value of the ipAdEntIfIndex is acquired if the processing is executed from step S201 described above.

In step S404, the acquisition unit 302 determines whether the acquisition request in step S401 has been repeatedly transmitted for a certain number of times. If the acquisition unit 302 determines that the acquisition request has been transmitted for the certain number of times (YES in step S404), the processing is ended as a failure in the acquisition. If the acquisition unit 302 determines that the acquisition request has not been transmitted for the certain number of times (NO in step S404), the processing proceeds to step S405. In step S405, the acquisition unit 302 increases a count for the number of processing times of the acquisition request by one, and the processing proceeds to step S406. In step S406, the acquisition unit 302 stands ready for a predetermined period of time, and returns the processing to step S401.

Figure 8:
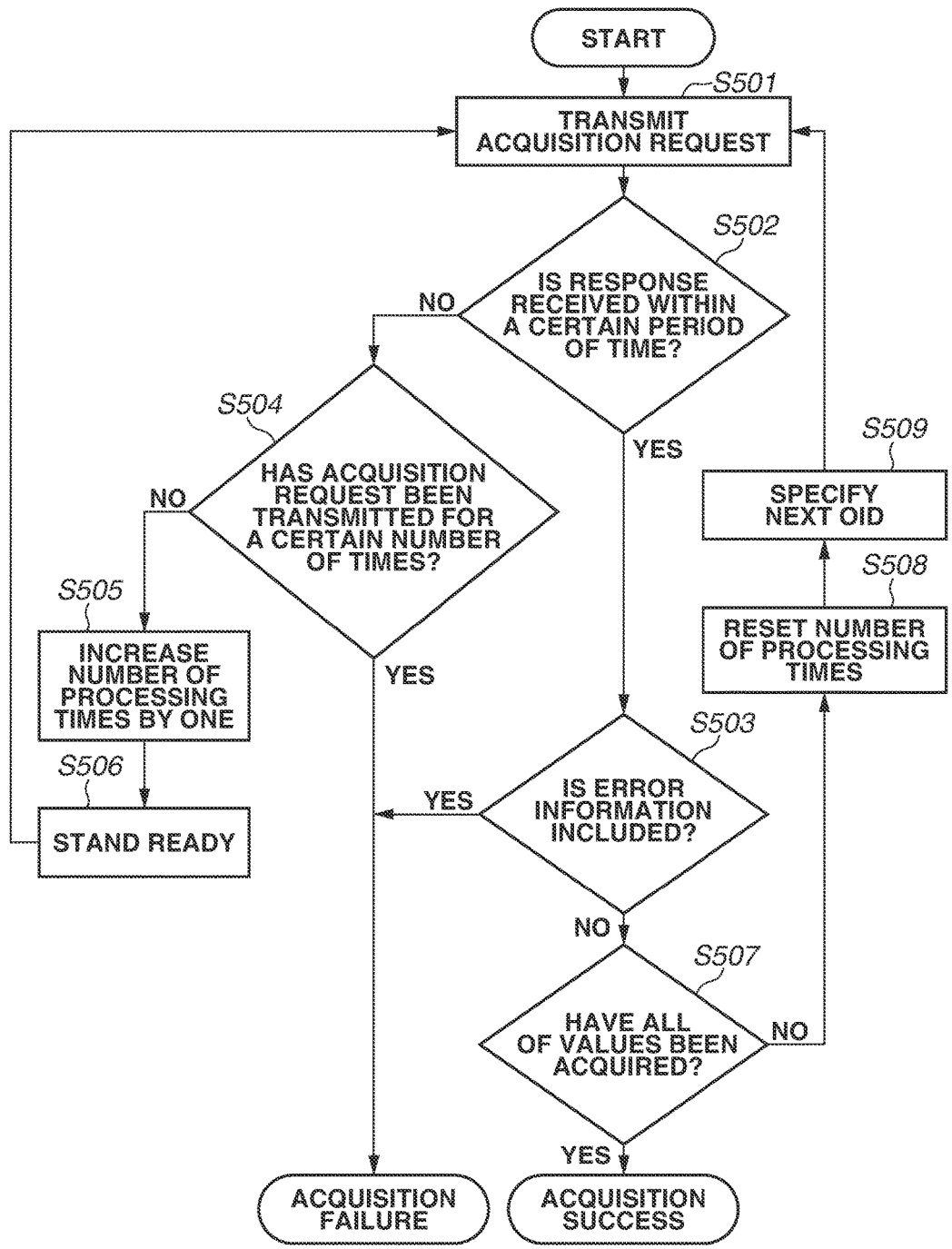
FIG. 8 is a flowchart illustrating processing for acquiring values with respect to a plurality of OIDs.

FIG. 8 is a flowchart illustrating processing for acquiring values corresponding to a plurality of OIDs. This processing is executed as the processing for acquiring a value of the ifType described in step S208 or S309, or the processing for acquiring a value of the ipAdEntIfIndex described in step S301. In both of the above cases, values of a plurality of OIDs in a table structure is acquired by repeatedly executing the GetNextRequest.

As described above, to acquire a value of the ifType, the management apparatus 101 executes the GetNextRequest by specifying "1.3.6.1.2.1.2.2.1.3" corresponding to the ifType as the OID 406, and acquires a first index value from a response transmitted by the management-target apparatus 102. Thereafter, the management apparatus 101 repeatedly executes the GetNextRequest specifying the index value included in the response and acquires a plurality of index values of the ifType from the management-target apparatus 102. Similar processing will be executed with respect to the processing for acquiring a value of the ipAdEntIfIndex.

The processing in steps S501 to S506 is similar to the processing in steps S401 to S406 in FIG. 7, and the description thereof will be omitted.

In step S507, the acquisition unit 302 determines whether the acquisition processing has been ended with respect to all of the acquisition-target OIDs. For example, in a case where a value other than "1.3.6.1.2.1.2.2.1.3.x" ("x" is a natural number) is received as a response to the GetNextRequest described above in acquiring the values of a plurality of OIDs in a table structure such as the ifType, the acquisition unit 302 can determine that acquisition of the values of all of the OIDs corresponding to the ifType has been ended with a response before the response. In step S507, if the acquisition unit 302 determines that acquisition of all of the values have been ended (YES in step S507), the acquisition thereof is regarded as a success, and the processing proceeds to the subsequent step in FIG. 5 or FIG. 6. In step S507, if the acquisition unit 302 determines that acquisition of all of the values have not been ended (NO in step S507), the processing proceeds to S508.

In step S508, the acquisition unit 302 resets the number of processing times counted in step S505. In step S509, as described above, the acquisition unit 302 specifies an index value included in the last response from the management-target apparatus 102 to acquire a value of the next OID to be acquired. Thereafter, the processing returns to step S501, and the acquisition unit 302 generates a GetNextRequest packet according to the specification, and transmits the packet to the management-target apparatus 102 as an acquisition request.

Figure 9:
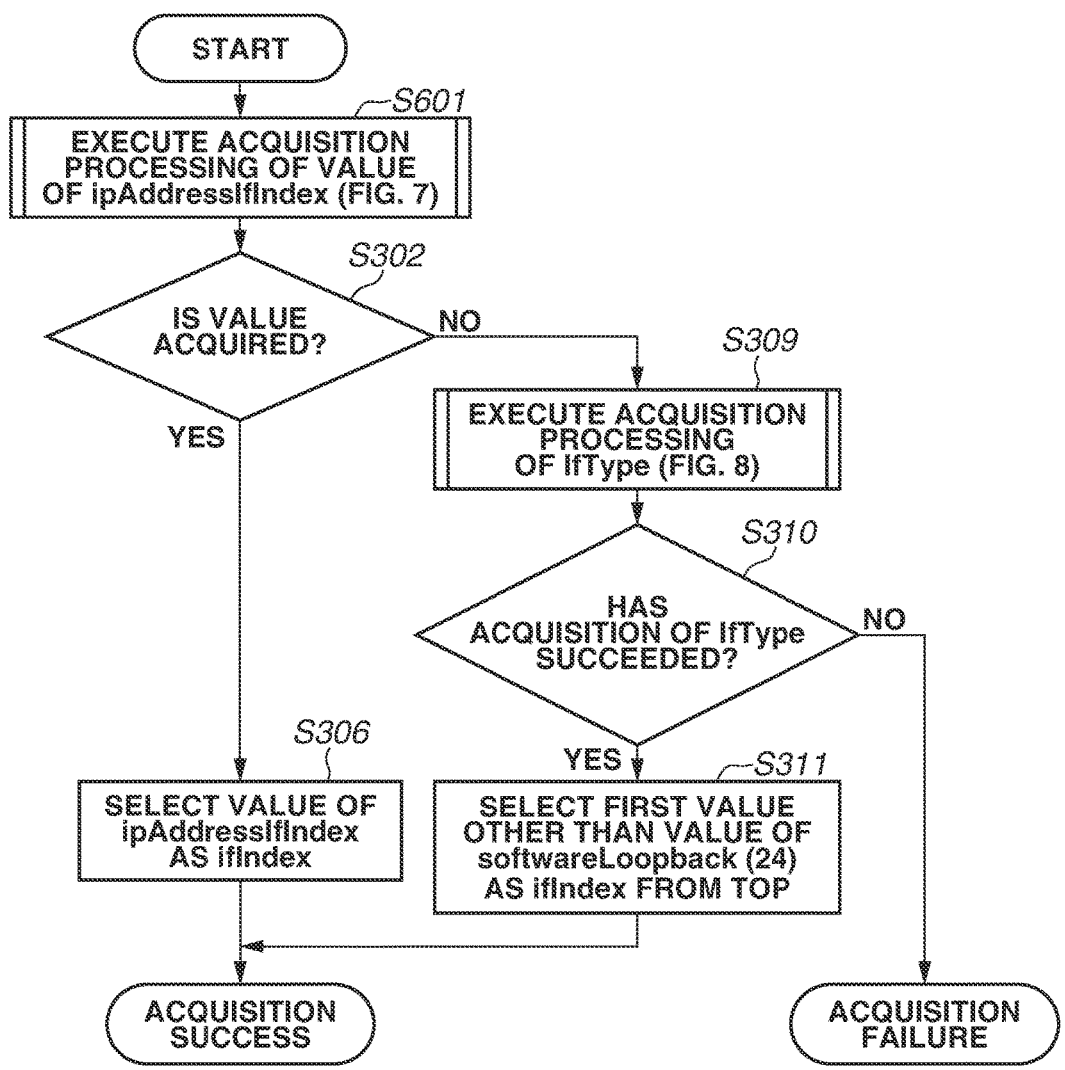
FIG. 9 is a flowchart illustrating selection processing of a value of an ifIndex in the IPv6 according to a second exemplary embodiment.

A second exemplary embodiment of the present invention is described below. In the present exemplary embodiment, a variation example of the processing described in the first exemplary embodiment with reference to FIG. 6 will be described with reference to FIG. 9. The present exemplary embodiment is different from the first exemplary embodiment only in that processing illustrated in FIG. 9 is executed in place of the processing in FIG. 6. Description of the processing similar to the processing described in the first exemplary embodiment is omitted.

FIG. 9 is a flowchart illustrating selection processing of a value of the ifIndex in the IPv6. A same reference numeral is applied to the processing step similar to that of FIG. 6. Such processes are similar to those illustrated in FIG. 6, and descriptions thereof are omitted.

In step S601, the acquisition unit 302 executes processing for acquiring a value of the ipAddressIfIndex specifying a value "2" indicating the IPv6 as the ipAddressAddrType and the IP address of the management-target apparatus 102 in communication acquired in step S101 as the ipAddressAddr. With this specification, the ipAddressIfIndex is specified to one value. In addition, details of this acquisition processing follow the flowchart in FIG. 7.

In the processing illustrated in FIG. 9, the processing in steps S303 to S305 and S307 to S308 is omitted from the processing illustrated in FIG. 6. However, as described above, depending on the implementation of the management-target apparatus 102, a portion "ipAddressPrefix." can be omitted from the ipAddressIfIndex. Accordingly, in step S601, in a case where the portion "ipAddressPrefix." is omitted in the implementation of the management-target apparatus 102 regarded as an acquisition request target, the OID may be determined as an error in step S403 of FIG. 7.

In this case, in order to select a value of the ifIndex indicating the communicating network interface 215 by using the ipAddressIfIndex without depending on the implementation of the management-target apparatus 102, it is necessary to execute the processing illustrated in FIG. 6.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-240578, filed Dec. 9, 2015, which is hereby incorporated by reference herein in its entirety.

What is claimed is:

1. A management apparatus capable of communicating with a network device including a plurality of network interfaces, the management apparatus comprising:
   a determination unit configured to determine whether an internet protocol (IP) address of the network device used for communicating with the network device is an IP address of an internet protocol version 4 (IPv4) or an IP address of an internet protocol version 6 (IPv6);
   a first request unit configured to issue, in a case where the determination unit determines that the IP address is the IP address of the IPv4, to the network device, an acquisition request for a first value used to identify a network interface managed, in correspondence with the IP address of the IPv4, by the network device with the IP address of the network device being specified;
   a second request unit configured to issue, in a case where the determination unit determines that the IP address is the IP address of the IPv6, to the network device, one or more acquisition requests for a plurality of values each of which is used to identify a corresponding one of a plurality of network interfaces, each of the plurality of network interfaces corresponding to a different one of a plurality of addresses of the IPv4 and the IPv6 managed by the network device in a table;
   a specification unit configured to specify a second value for identifying a network interface corresponding to the IP address of the IPv6 included in a response from the network device to the acquisition request issued by the second request unit; and
   a third request unit configured to issue an acquisition request for a media access control (MAC) address to the network device with the first value included in a response from the network device to the acquisition request issued by the first request unit being specified or with the second value specified by the specification unit being specified.

2. The management apparatus according to claim 1, further comprising:

a fourth request unit configured to issue, to the network device, a plurality of acquisition requests for a plurality of values each of which is used to identify a corresponding one of the plurality of network interfaces of the network device, in a case where any value used to identify the network interface cannot be acquired from the network device with the acquisition request issued by the first request unit or the one or more acquisition requests issued by the second request unit,
wherein the specification unit specifies any value except for a third value corresponding to a loopback address from among a plurality of values included in a response from the network device to the request made by the fourth request unit.

3. A method for an apparatus that communicates with a network device having a plurality of network interfaces, the method comprising:
   determining whether an IP address of the network device used for communicating with the network device is an IP address of an IPv4 or an IP address of an IPv6;
   issuing, in a case where the IP address is determined to be the IP address of the IPv4, to the network device, a first acquisition request for a first value used to identify a network interface managed, in correspondence with the IP address of the IPv4, by the network device with the IP address of the network device being specified;
   issuing, in a case where the IP address is determined to be the IP address of the IPv6, to the network device, one or more second acquisition requests for a plurality of values each of which is used to identify a corresponding one of the plurality of network interfaces, each of a plurality of network interfaces corresponding to a different one of a plurality of addresses of the IPv4 and the IPv6 managed by the network device in a table;
   specifying a second value for identifying a network interface corresponding to the IP address of the IPv6 included in a response from the network device to the second acquisition request; and
   issuing a third acquisition request for a MAC address to the network device with the first value included in a response from the network device to the first acquisition request being specified or with the second value being specified.

4. A non-transitory computer readable storage medium on which is stored a computer program for making a computer execute a method for an apparatus communicating with a network device which includes a plurality of network interfaces, the method comprising:
   determining whether an IP address of the network device used for communicating with the network device is an IP address of an IPv4 or an IP address of an IPv6;
   issuing, in a case where the IP address is determined to be the IP address of the IPv4, to the network device, a first acquisition request for a first value used to identify a network interface managed, in correspondence with the IP address of the IPv4, by the network device with the IP address of the network device being specified;
   issuing, in a case where the IP address is determined to be the IP address of the IPv6, to the network device, one or more second acquisition requests for a plurality of values each of which is used to identify a corresponding one of the plurality of network interfaces, each of a plurality of network interfaces corresponding to a different one of a plurality of addresses of the IPv4 and the IPv6 managed by the network device in a table;
   specifying a second value for identifying a network interface corresponding to the IP address of the IPv6 included in a response from the network device to the second acquisition request; and issuing a third acquisition request for a MAC address to the network device with the first value included in a response from the network device to the first acquisition request being specified or with the second value being specified.

\* \* \* \* \*